United States Patent [19]
Ishida et al.

[11] Patent Number: 5,359,385
[45] Date of Patent: Oct. 25, 1994

[54] CAMERA HAVING LEARNING FUNCTION

[75] Inventors: Tatsuya Ishida, Kawachinagano; Koji Hata, Osaka; Kohtaro Hayashi, Hirakata; Akuhiko Fujino, Sakai; Hiroshi Ootsuka, Sakai; Katsuyuki Nanba, Sakai, all of

[73] Assignee: Minolta Camera Kabushiki Kaisha, Osaka, Japan

[21] Appl. No.: 2,673

[22] Filed: Jan. 11, 1993

Related U.S. Application Data

[63] Continuation of Ser. No. 661,814, Feb. 28, 1991, abandoned.

[30] Foreign Application Priority Data

| Mar. 1, 1990 | [JP] | Japan | 2-50717 |
| Mar. 1, 1990 | [JP] | Japan | 2-50718 |
| Mar. 1, 1990 | [JP] | Japan | 2-50719 |
| Mar. 1, 1990 | [JP] | Japan | 2-50720 |
| Jun. 29, 1990 | [JP] | Japan | 2-173921 |

[51] Int. Cl.$^5$ .................. G03B 7/091; G03B 7/28; G03B 17/20; G03B 17/00
[52] U.S. Cl. .................. 354/412; 354/433; 354/472; 354/289.12
[58] Field of Search .......... 354/410, 412, 429, 431, 354/432, 433, 434, 465, 471, 474, 475, 289.1, 289.12, 21, 472

[56] References Cited

U.S. PATENT DOCUMENTS

| 4,763,144 | 8/1988 | Taniguchi et al. | 354/475 X |
| 4,862,205 | 8/1989 | Kawamura | 354/412 |
| 4,965,443 | 10/1990 | Yamasaki et al. | 250/201.7 |
| 4,978,990 | 12/1990 | Yamasaki et al. | 354/432 |
| 5,023,649 | 1/1991 | Hayashi et al. | 354/434 |
| 5,159,364 | 10/1992 | Yanagisawa et al. | 354/21 |

FOREIGN PATENT DOCUMENTS

| 2-96707 | 10/1963 | Japan. |
| 2-96723 | 10/1963 | Japan. |
| 1-300237 | 12/1989 | Japan. |

Primary Examiner—W. B. Perkey
Attorney, Agent, or Firm—Burns, Doane, Swecker & Mathis

[57] ABSTRACT

A camera having a learning function which automatically sets data for current photographing in accordance with a tendency of data set in the past (learned data) and takes a photograph in accordance with the data thus set. The camera comprises a light measuring section for measuring a brightness of an object for the photographing, a calculating section for calculating an exposure control value in accordance with the brightness of the object for the photographing, a first setting section for manually setting first data with which the exposure control value is to be corrected, a first correcting section for correcting the exposure control value in accordance with the first data, a second setting section for setting second data in accordance with first data set in the past by the first setting section, a second correcting section for correcting the exposure control value in accordance with the second data, and an exposure controlling section for executing exposure control in accordance with the exposure control value corrected by the first correcting section or the second correcting section.

37 Claims, 9 Drawing Sheets

CAMERA HAVING LEARNING FUNCTION

This application is a continuation of application Ser. No. 07/661,814, filed Feb. 28, 1991, abandoned.

BACKGROUND OF THE INVENTION

1. Field of the Invention

This invention relates to a camera having a function of setting data in accordance with a tendency of data set in the past.

2. Description of the Prior Art

Cameras having an automatic exposure controlling function are already on the market. Such automatic exposure controlling function measures light of a field to be photographed by various methods and determines a suitable exposure value in accordance with a predetermined algorithm from such measured light value. However, a photographer may sometimes want to have a little under or over exposure with respect to an exposure value determined by the camera. In order to cope with such circumstance, conventional cameras often have a function of exposure correction for correcting, by manual operation, an exposure value determined by the camera.

However, it is cumbersome to perform such exposure correcting operation each time photographing is to be performed. Therefore, it often occurs that a photographer forgets or fails to perform an exposure correcting operation or an exposure correcting operation is omitted taking a shutter chance preferentially. In such case, a photograph taken likely provides a finish feeling different from that intended by the photographer.

Further, it is also cumbersome to change various data for the photographing each time a photograph is be taken whether or not it is performed for exposure correction.

SUMMARY OF THE INVENTION

It is an object of the present invention to provide a camera having a learning function which automatically sets data for current photographing in accordance with a tendency of data set in the past (learned data) and takes a photograph in accordance with the data thus set.

In order to attain the object, according to one aspect of the present invention, there is provided a camera which comprises light measuring means for measuring a brightness of an object for the photographing: calculating means for calculating an exposure control value in accordance with the brightness of the object for the photographing; first setting means for manually setting first data with which the exposure control value is to be corrected; first correcting means for correcting the exposure control value in accordance with the first data; second setting means for setting second data in accordance with first data set in the past by the first setting means; second correcting means for correcting the exposure control value in accordance with the second data; and exposure controlling means for executing exposure control in accordance with the exposure control value corrected by the first correcting means or the second correcting means.

With the camera, since exposure correction is performed in accordance with a tendency of exposure correction in the past, an operation for such exposure correction need not be performed each time a photograph is to be taken.

According to another aspect of the present invention, there is provided a camera which comprises first setting means for manually setting first data for the photographing; first controlling means for controlling operation of the camera in accordance with the first data; storage means having storage sections corresponding to possible conditions of an object for the photographing; condition detecting means for detecting a condition of an object for the photographing; storage controlling means for updating contents of one of the storage sections which corresponds to the condition detected by the condition detecting means in accordance with the first data; second setting means for setting second data in accordance with the contents of the storage section corresponding to the condition detected by the condition detecting means; second controlling means for controlling operation of the camera in accordance with the second data; and change-over means for alternatively rendering the first controlling means and the second controlling means effective.

With the camera, a tendency of data is learned for each condition (scene) of an object for the photographing, and accordingly, a photograph can be taken in accordance with a tendency of data suitable for a scene of an object for the photographing.

According to a further aspect of the present invention, there is provided a camera which comprises light measuring means for measuring a brightness of an object for the photographing; first calculating means for calculating an exposure control value in accordance with the brightness of the object for the photographing detected by the light measuring means; storage means for storing therein information regarding exposure control in the past; second calculating means for calculating an exposure control value in accordance with the brightness of the object for the photographing detected by the light measuring means and the information stored in the storage means; and selecting means for selecting one of the exposure control values calculated by the first calculating means and the second calculating means; the light measuring means including first light measuring means for measuring light of a comparatively large area of a screen, second light measuring means for measuring light of a comparatively small area of the screen, and means for selecting one of the light values measured by the first light measuring means and the second light measuring means; the selecting means selecting the exposure control value calculated by the first calculating means when the light value measured by the second light measuring means is selected by the light measuring means.

When measurement of light of a small area (spot light measurement) is performed, generally no correction is made, in most cases, for a light value obtained by such light measurement upon photographing. With the camera, however, correction with learned data is automatically prevented upon spot light measurement, and accordingly, no unnecessary correction is performed.

According to a still further aspect of the present invention, there is provided a camera which comprises light measuring means including first light measuring means for measuring light of a comparatively large area of a screen, second light measuring means for measuring light of another comparatively small area of the screen, and selecting means for manually selecting one of the light values measured by the first light measuring means and the second light measuring means; storage means for storing therein information regarding exposure control in the past; calculating means for calculating an exposure control value in accordance with a measurement light output of the light measuring means and the information stored in the storage means; exposure controlling means for executing exposure control in accordance with the exposure control value calculated by the calculating means; learning data calculating means for calculating a difference between the measurement light value detected by the first light measuring means and the measurement light value detected by the second light measuring means; and storage controlling means for updating contents of the information stored in the storage means in accordance with the difference when the measurement light value by the second light measuring means is manually selected by the selecting means.

With the camera, when a photographer manually selects the spot light measurement wherein light of a comparatively large area of a screen is measured, the exposure control value is learned, and accordingly, the camera can learn a tendency of setting of data by the photographer.

According to a yet further aspect of the present invention, there is provided a camera which comprises first controlling means for controlling operation of the camera in accordance with a predetermined sequence; storage means for storing therein information regarding photographing in the past; second controlling means for controlling operation of the camera in accordance with stored contents of the storage means; selecting means for alternatively rendering the first controlling means and the second controlling means effective; and display means for displaying predetermined information when the second controlling means is effective.

With the camera, a photographer can recognize from a display on the display means whether the camera learns or not, and consequently, the photographer can prevent the camera from learning wrong data.

According to a yet further aspect of the present invention, there is provided a camera which comprises first controlling means for controlling operation of the camera in accordance with a predetermined sequence; storage means for storing therein information regarding photographing in the past; second controlling means for controlling operation of the camera in accordance with stored contents of the storage means; and selecting means for alternatively rendering the first controlling means and the second controlling means effective; the selecting means operating automatically in response to a predetermined condition.

With the camera, whether or not the camera learns data is automatically changed over in response to a predetermined condition such as an exposure controlling operation of the camera. Accordingly, operation of the camera is facilitated.

According to a yet further aspect of the present invention, there is provided a camera which comprises setting means for manually setting data for the photographing; storage means for storing therein such data for a predetermined number of photographing operations; calculating means for calculating data for a current photographing operation in accordance with the stored data for the predetermined number of photographing operations; and controlling means for controlling operation of the camera in accordance with the data calculated by the calculating means.

With the camera, a tendency of data set by a photographer for the predetermined number of photographing operations in the past can be recognized. Further, since the oldest data are erased, a latest tendency can be recognized.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
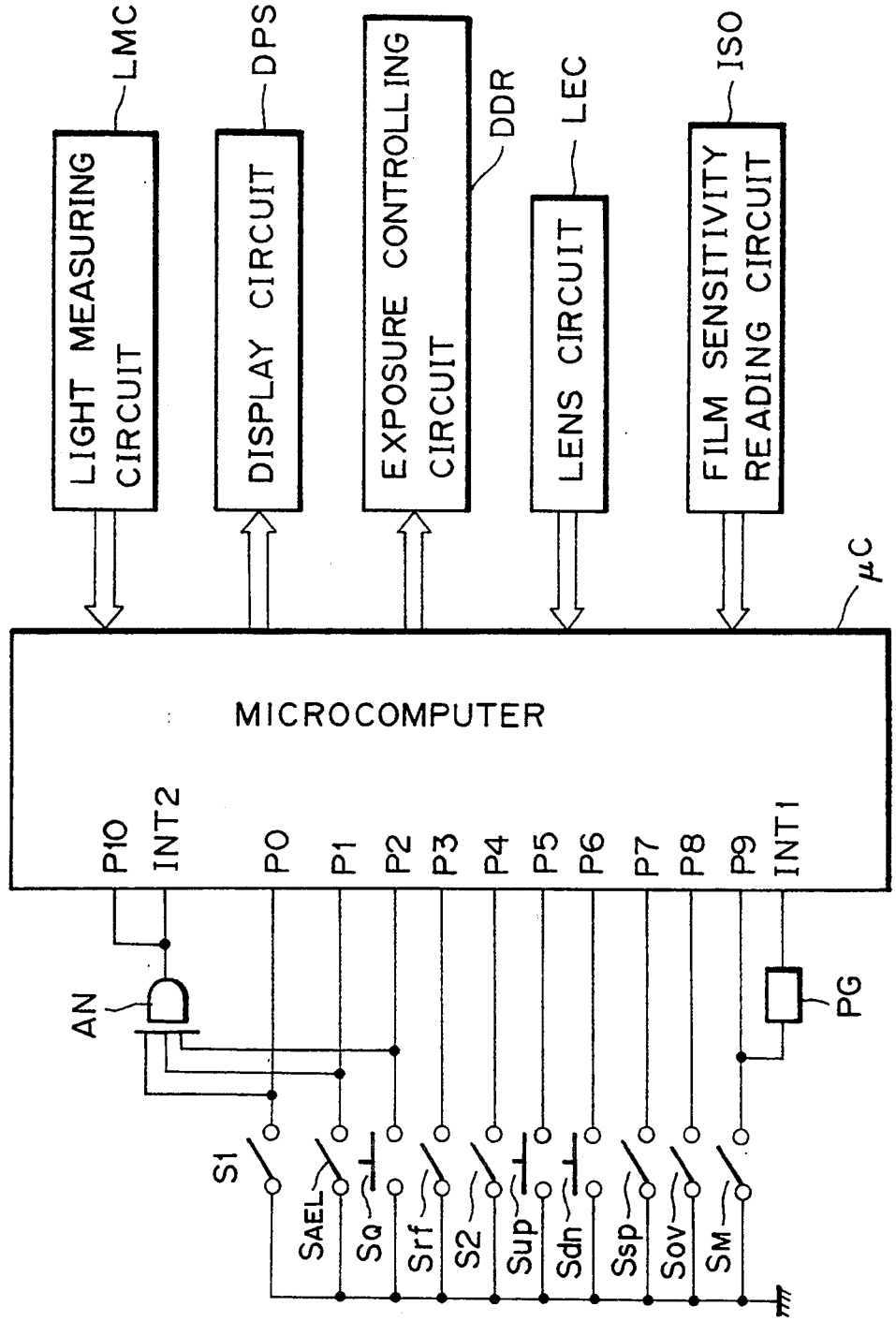
FIG. 1 is a block circuit diagram of a camera showing a preferred embodiment of the present invention.

Referring first to FIG. 1, there is shown an electric circuit of a camera to which the present invention is applied. The circuit shown includes a microcomputer $\mu C$ for executing exposure calculations as well as exposure control and sequence control of the entire camera. The microcomputer $\mu C$ is connected to various peripheral circuits so that information may be exchanged between them.

Figure 2:
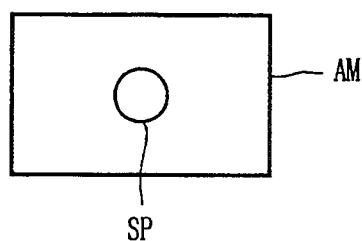
FIG. 2 is a diagrammatic view illustrating a light measuring area of the camera of FIG. 1.

The circuit further includes a light measuring circuit LMC for performing TTL (through-the-lens) light measurement. Referring to FIG. 2, the light measuring circuit LMC measures light of two light measurement areas including a circular central area SP of a photographic screen and a peripheral area AM which is the remaining area of the photographic screen around the central area SP. The ratio between the central area SP and the peripheral area AM is set to 1:8. The light measuring circuit LMC has a spot light measuring function of measuring light at the central area SP of the photographic screen to determine a spot measurement light value $BV_{SP}$, and a peripheral light measuring function of measuring light at the remaining peripheral area AM of the photographic screen to determine a peripheral area measurement light value $BV_{AM}$. Information of such spot measurement light value $BV_{SP}$ and peripheral area measurement light value $BV_{AM}$ is converted into digital amounts and then transmitted to the microcomputer $\mu C$.

Referring back to FIG. 1, the electric circuit of the camera further includes a display circuit DSP which receives display data from the microcomputer $\mu C$ and provides a necessary display in a viewfinder of the camera. Contents of such display will be hereinafter described.

An exposure controlling circuit DDR controls an aperture diaphragm not shown and a shutter not shown of the camera in accordance with an aperture value and a shutter speed calculated by the microcomputer $\mu C$ and further controls winding up of a film.

A lens circuit LEC is built in a photographing lens not shown of the camera and transmits lens data peculiar to the photographing lens to a body not shown of the camera. Such lens data may include an open aperture value $AV_O$, a focal length f, distance data $D_U$ and so forth.

A film sensitivity reading circuit ISO reads information of a film sensitivity recorded in a semiconductor memory or the like mounted in a film magazine or the like and transmits such information to the microcomputer $\mu C$. Such information is used in AE (automatic exposure) calculation executed by the microcomputer $\mu C$. It is to be noted that a manually operable member such as a push-button or a dial is provided for the film sensitivity reading circuit ISO so as to perform setting of or modification to a film sensitivity.

The microcomputer $\mu C$ has input ports P0 to P10 which are normally pulled up to a "High" level each by way of a resistor not shown and individually connected to the ground level by way of different switches. If one of the switches is switched on, then the voltage level at a corresponding one of the input ports is changed to a "Low" level, and accordingly, on/off states of the switches are individually discriminated by the microcomputer $\mu C$. Such switches will be individually described below.

In particular, a photographing preparing switch S1 is turned on when a release button not shown of the camera is depressed to a first depth or over a first stroke. If the photographing preparing switch S1 Is turned on, then light measuring and exposure calculating operations are started in the microcomputer $\mu C$.

A state switch (AE locking switch) $S_{AEL}$ is provided for performing AE locking, and AE looking is performed only when the state switch $S_{AEL}$ is on.

A learning mode switch $S_Q$ is a normally open switch and is operated for causing an exposure correction value then to be fed back to an exposure value which is determined for next exposure.

A state switch (light measurement reference selecting switch) Srf is provided for selecting one of an average measurement light value and a spot measurement light value as a reference value for measurement light display, and when the state switch Srf is on, an average measurement light value is selected as a reference value, but when the state switch Srf is off, a spot measurement light value is selected.

A release switch S2 is turned on when the release button is depressed to a second depth or over a second stroke greater than the first stroke. If the release switch S2 is turned on, then an exposure controlling operation is started.

An up switch Sup and a down switch Sdn are normally open switches, and when a switch $S_{OU}$ which will be hereinafter described is in an on-state, they act as up and down switches for setting an override amount, respectively.

A state switch (spot light measuring switch) $S_{SP}$ is operated to perform spot light measurement, and when the state switch $S_{SP}$ is on, the camera is in a spot light measuring mode, but when the state switch $S_{SP}$ is off, the camera is in an automatic light measuring mode. In the automatic light measuring mode of the camera, a scene of an object for the photographing is identified from a reference measurement light value BVrf, a photographing magnification $\beta$, a peripheral area measurement light value $BV_{AM}$ and a spot measurement light value $BV_{SP}$, and an exposure value is automatically corrected in accordance with a tendency of exposure correction in the past for the scene thus identified.

The override switch $S_{OU}$ mentioned above is provided to perform exposure correction, and if the up or down switch Sup or Sdn is operated while the override switch $S_{OU}$ is kept on, then the override amount is increased or decreased. It is to be noted that, when the override switch $S_{OU}$ is off, the up or down switch Sup or Sdn can be used to increase or decrease some other amount or parameter of the camera, but since such amount or parameter has no relation to the present invention, description thereof is omitted herein.

A main switch $S_M$ is provided to control operation of the camera, and when the main switch $S_M$ is on, operation of the camera is enabled, but when the main switch $S_M$ is off, operation of the camera is disabled.

Figure 3:
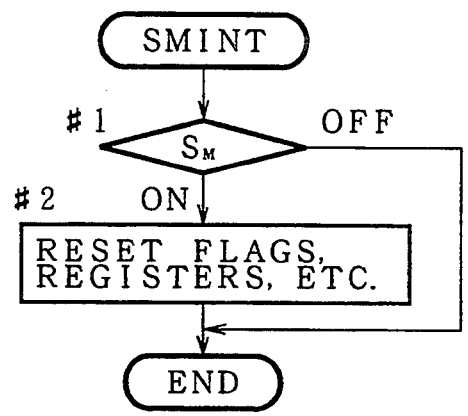
FIGS. 3 to 6 are flow charts illustrating operation of the camera of FIG. 1.

When the main switch $S_M$ is turned on or off, a signal which changes from a "High" level to a "Low" level is inputted from a pulse generator PG to an interrupt input terminal INT1 of the microcomputer $\mu C$, and in response to such signal, the microcomputer $\mu C$ executes a routine SMINT shown in a flow chart of FIG. 3.

Referring to FIG. 3, the microcomputer $\mu C$ first checks, at step #1, a state of the input port P9 thereof to judge whether the main switch $S_M$ is on or off. If the main switch $S_M$ is off, then the microcomputer $\mu C$ stops operation of itself. On the other hand, if the main switch $S_M$ is on, then all flags, registers and so forth of the microcomputer $\mu C$ are reset at step #2. Thus, for example, an exposure correction value BV4 which will be hereinafter described is reset here. However, an $E^2$-PROM which will be hereinafter described is not reset. After completion of such resetting operation, the microcomputer $\mu C$ stops operation of itself.

On the other hand, if any one of the photographing preparing switch S1, AE locking switch $S_{AEL}$ and learning mode switch $S_Q$ is turned on, then an output to an AND circuit AN changes from a "High" level to a "Low" level, and such signal is inputted to another interrupt input terminal INT2 of the microcomputer $\mu C$. In response to such signal, the microcomputer $\mu C$ executes a routine S1INT shown in a flow chart of FIG. 4.

Figure 4:
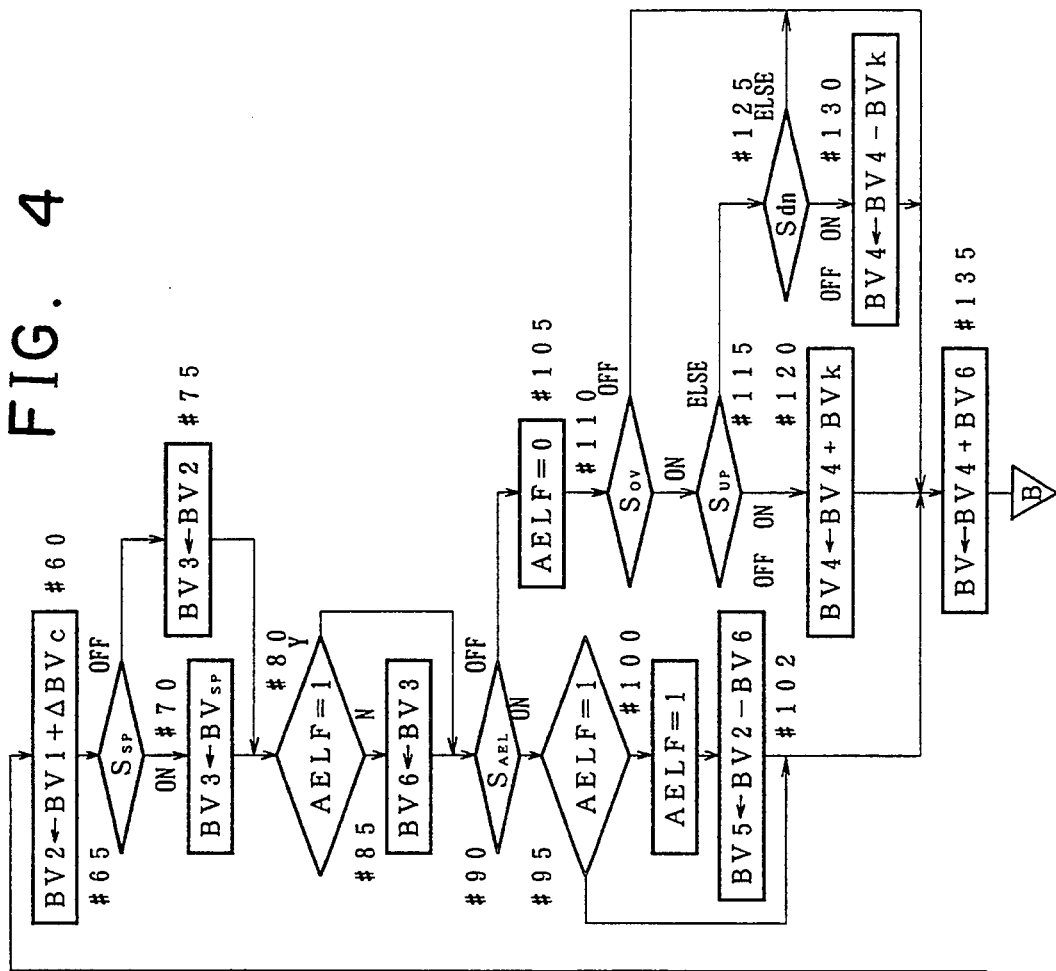
Figure 4:
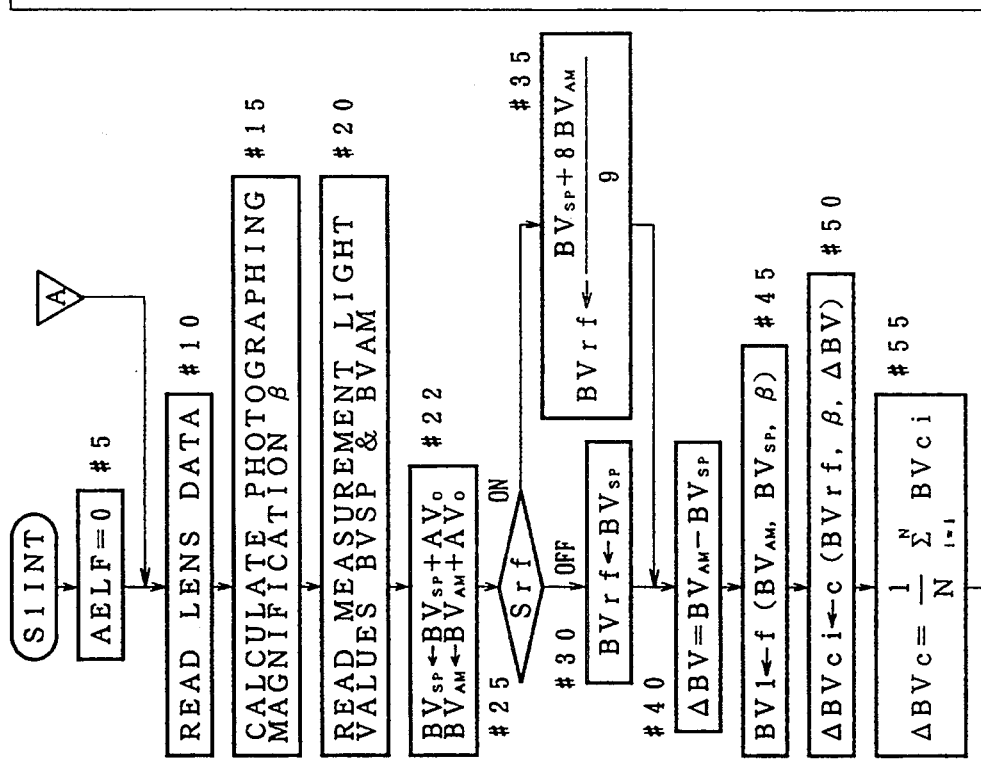

Referring to FIG. 4, the microcomputer $\mu C$ resets, first at step #5, a flag AELF representative of AE locking. Then at step #10, the microcomputer $\mu C$ reads lens data peculiar to the photographing lens from the lens circuit LEC. Such lens data at least include an open aperture value $AV_O$, a focal length f and distance data $D_U$. Then, a photographing magnification $\beta$ is calculated from the thus inputted focal length f and distance data $D_U$ at step #15. Subsequently, the microcomputer $\mu C$ reads a spot measurement light value $BV_{SP}$ and a peripheral area measurement light value $BV_{AM}$ from the light measuring circuit LMC at step #20 and adds the open aperture value $AV_O$ to the thus read measurement light values $BV_{SP}$ and $BV_{AM}$ at step #22. Then, it is judged at step #25 from the switch Srf whether a spot measurement light value or an average measurement light value should be employed as a reference measurement light value. If it is judged that a spot measurement light value should be employed, then the spot measurement light value $BV_{SP}$ is substituted into the reference measurement light value BVrf at step #30, but on the contrary if it is judged that an average measurement light value should be employed, then an average light measurement value $BV_{AU}=(BV_{SP}+8\ BV_{AM})/9$ is substituted into the reference measurement light value BVrf at step #35. Subsequently, in either case, a difference between the peripheral area measurement light value $BV_{AM}$ and the spot measurement light value $BV_{SP}$, that is, $BV_{AM}-BV_{SP}$, is calculated to obtain a brightness difference ΔBV at step #40. Then at step #45, a multi-division measurement light value BV1 is calculated from the photographing magnification β, spot measurement light value $BV_{SP}$ and peripheral area measurement light value $BV_{AM}$ in accordance with the following expression;

$$BV1 = k\, BV_{SP} + (1-k) BV_{AM}$$

where the coefficient k (<1) is a weighting coefficient for the spot measurement light value $BV_{SP}$ and the peripheral area measurement light value $BV_{AM}$ and is set in the following manner taking a size of a main object for the photographing presumed from the photographing magnification β into consideration.

In the case of $β ≧ 1/10$, it is considered that a main object for the photographing occupies a full area of a photographing screen, and therefore, the coefficient k is set to k=0.5 so as to achieve centrally emphasized light measurement.

In the case of $1/10 > β ≧ 1/40$, it is considered that a main object is a little smaller and the ratio of a portion of the main object included in the central area with respect to the remaining portion of the main object included in the peripheral area is higher, and therefore, the coefficient k is set to k=0.6.

In the case of $1/40 > β ≧ 1/100$, it is considered that a main object is further smaller and the ratio of a portion of the main object included in tire central area is further higher, and therefore, the coefficient k is set to k=0.8.

In the case of $1/100 > β ≧ 1/150$, it is considered that a main object is still further smaller but it may not necessarily be included in the central spot light measurement area, and therefore, in order to make the weight of the central portion lower a little, the coefficient k is set to k=0.4.

In the case of $1/150 > β$, it is considered that probably a main object for the photographing is a landscape, and therefore, in order to achieve average light measurement, the coefficient k is set to k=0.2.

Subsequently at step #50, a scene of an object for the photographing is discriminated from the reference measurement light value BVrf, photographing magnification β and brightness difference ΔBV and N exposure correction values $ΔBV_{ci}$ set in the N preceding photographing operations are read in with regard to the thus discriminated scene. In short, one scene c (BVrf, β, ΔBV) is determined from one combination of the reference measurement light value BVrf, photographing magnification β and brightness difference ΔBV, and N exposure correction values ΔBVci (i=1, ..., N) in the preceding photographing operations are stored for each such scene c (BVrf, β, ΔBV). The exposure correction values ΔBVci are stored in an E²PROM built in the microcomputer μC (or another E²PROM built in an IC card to be removably loaded into the camera) such that they are not erased even if the main switch $S_M$ of the camera is switched off. Subsequently at step #55, an average of the N exposure correction values ΔBVci (i=1, ..., N) read out from the E²PROM is calculated and determined as a learned correction value ΔBVc for the scene. Then at step #60, the correction value ΔBVc is added to the measurement light value BV1 to obtain an automatic measurement light value BV2. The automatic measurement light value BV2 thus obtained presents a light measurement value which is forecast to provide appropriate exposure for the scene of the object for the photographing then, reflecting a result of learning with regard to the scene.

Here, a scene of an object for the photographing will be described. The camera of the present invention learns a tendency of exposure correction in the past and forecasts an exposure correction value ΔBVc a photographer wants, and then adds the thus forecast exposure correction value ΔBVc to a measurement light value BV1 to automatically obtain a measurement light value BV2 which is corrected so as to provide appropriate exposure. Such exposure correction value ΔBVc is different for different scenes of objects for the photographing. For example, the direction for exposure correction is considered to be opposite for a regularly lighted condition and a back lighted condition. Thus, a regular light scene and a back-light scene are discriminated from each other using a brightness difference ΔBV between a spot measurement light value $BV_{SP}$ and a peripheral area measurement light value $BV_{AM}$.

Meanwhile, the tendency of exposure correction is considered different for a landscape scene, a person scene and a close-up scene. Thus, those scenes are discriminated from one another using a photographing magnification β. Further, the tendency of exposure correction is considered different for a snow-covered mountain photographing scene of a high brightness and a night photographing scene of a low brightness. Thus, a high brightness scene and a low brightness scene are discriminated from each other using a reference measurement light value BVrf. It is to be noted that it is also possible to divide a photographing screen into a plurality of areas and combine object distance information and object brightness information obtained for those areas to discriminate a scene of a complicated object for the photographing.

Subsequently at step #65, the microcomputer μC judges whether the spot light measuring switch $S_{SP}$ is on or off. If the switch $S_{SP}$ is on, then this means that spot light measurement should be performed, and accordingly, the spot measurement light value $BV_{SP}$ is substituted into a final measurement light value BV3 at step #70. But on the contrary if the switch $S_{SP}$ is off at step #65, then this means that automatic light measurement should be performed, and accordingly, the automatic measurement light value BV2 is substituted into the final measurement light value BV3 at step #75. Then, it is judged at step #80 whether or not the flag AELF representative of AE locking is in a set state. If the flag AELF is not in a set state, then the final measurement light value BV3 is substituted into a measurement light value BV6 before correction at step #85, whereafter the control sequence advances to step #90, but on the contrary if the flag AELF is in a set state, then the control sequence advances directly to step #90 skipping the step #85. At step #90, it is judged whether the AE locking switch $S_{AEL}$ is in an on state or in an off state. If the switch $S_{AEL}$ is in an on state, then it is judged at step #95 whether or not the flag AELF representative of AE locking is in a set state, and then in case the flag AELF is in a set state, that is, in case the switch $S_{AEL}$ still remains on since a preceding control cycle, the control sequence advances to step #135. On the other hand, in case the flag AELF is not in a set state at step #95, that is, immediately after turning on of the AE locking switch $S_{AEL}$, the control sequence advances to step #100 at which the flag AELF Is set and then to step #102 at which a correction value BV5 is obtained by calculation of BV2−BV6, whereafter the control sequence advances to step #135. In short, when the switch $S_{SP}$ is on, $BV2-BV_{SP}$ is substituted into BV5.

Meanwhile, in case the AE locking switch $S_{AEL}$ is in an off state at step #90, the flag AELF representative of AE locking is reset at step #105, and then it is judged at step #110 whether the override switch $S_{OU}$ is in an on state or an off state. If the override switch $S_{OU}$ is in an on state, then it is judged at step #115 whether or not the up switch Sup has changed from an off state to an on state. If the up switch Sup has changed from an off state to an on state, then a predetermined value BVk (for example, ⅛ EV) is added to the correction value BV4 at step #120, whereafter the control sequence advances to step #135. On the other hand, in case It is not judged at step #115 that the up switch Sup has changed from an off state to an on state, it is judged subsequently at step #125 whether or not the down switch Sdn has changed from an off state to an on state. If the down switch Sdn has changed from an off state to an on state, then the predetermined value BVk is subtracted from the correction value BV4 at step #130, whereafter the control sequence advances to step #135. On the other hand, in case it is judged at step #110 that the override switch $S_{OU}$ is in an off state or in case it is judged at steps #115 and #125 that neither of the up switch Sup and down switch Sdn has changed from an off state to an on state, the control sequence advances directly to step #135 without modifying the correction value BV4. At step #135, the correction value BV4 thus obtained is added to the measurement light value BV6 before correction to obtain a measurement light value BV6 for control.

Here, a difference between the correction values BV4 and Bv5 will be described. The correction value BV4 is an override amount which is set by manual operation and can be Increased or decreased by a unit of BVk by operating the up or down switch Sup or Sdn while the override switch $S_{OU}$ is kept on. Since the correction value BV4 relies upon personality and taste of a photographer, it may be different for each photographer and is normally different for each scene of an object for the photographing. On the other hand, the correction value BV5 is a correction value relying upon a reflectance of an object for the photographing or each scene of an object for the photographing. Such correction value BV5 is set by performing AE locking in a spot light measuring mode of the camera and corresponds to a difference in brightness between a spot measurement light value $BV_{SP}$ in an AE locked condition of the camera and an automatic measurement light value BV2. Since the automatic measurement light value BV2 is a measurement light value obtained by automatic exposure correction by scene discrimination, it is desired to have a measurement light value appropriate for an arbitrary scene. However, the fact that a photographer selects a spot light measuring mode for a particular scene and performs AE locking signifies that an automatic measurement light value BV2 determined by the camera is not suitable for the scene. Thus, in such an instance, if a photographer wants, then it is necessary to learn a difference in brightness between the spot measurement light value $BV_{SP}$ and the automatic measurement light value BV2 in an AE locked condition of the camera as an exposure correction value for the scene. For example, if a person is photographed in a back-lighted scene using an automatic light measuring mode before learning, then the background is frequently so bright that the person may look dark in a smeared away condition. In such an instance, if a spot light measuring mode is selected and a spot measurement light value $BV_{SP}$ is found out with a person placed in the spot light measuring area and is used for exposure control in an AE locked condition, then the person is photographed in an appropriately exposed condition. Then, if a brightness difference between the spot measurement light value $BV_{SP}$ and the automatic measurement light value BV2 used for exposure then is learned as a correction value BV5 for the back-lighted scene, then the probability is high that, in an automatic light measuring mode after then, a person is photographed with appropriate exposure even in a back-lighted scene. It is to be noted that, since the measurement light value BV8 before correction is equal to the automatic measurement light value BV2 when the camera is AE locked in an automatic light measuring mode, the correction value BV5 is 0.

Figure 5:
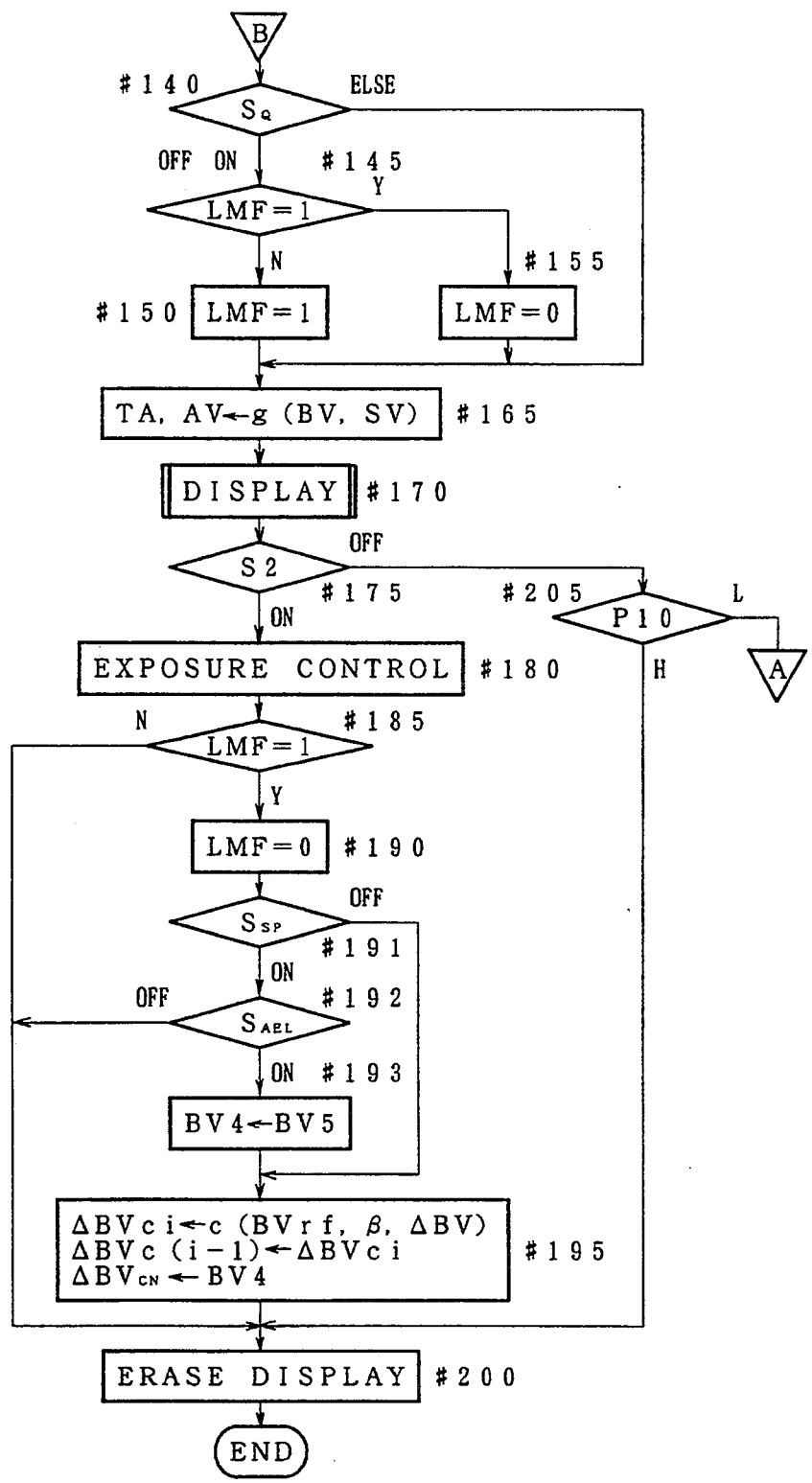

The control sequence advances from step #135 shown in FIG. 4 to step #140 shown in FIG. 5. Referring now to FIG. 5, the microcomputer μC judges at step #140 whether or not the learning mode switch $S_Q$ has changed from an off state to an on state. If the switch $S_Q$ has changed from an off state to an on state, then it is judged at step #145 whether or not a flag LMF representative of a learning mode is in a set state. Then, if the flag LMF is in a set state, then it is reset at step #155, but on the contrary if the flag LMF is in a reset state, then it is set at step #150, whereafter the control sequence advances, in either case, to step #165. On the other hand, in case it is not detected at step #140 that the learning mode switch $S_Q$ has changed from an off state to an on state, the control sequence advances directly to step #165 without executing anything.

At step #165, a predetermined calculation is executed from the measured light value BV and the film sensitivity SV to obtain an exposure value EV (in short, a combination between a shutter speed TV and an aperture value AV), and then a display subroutine which will be hereinafter described is executed at step #170. After completion of required display, it is judged at step #175 whether the release switch S2 is in an on state or off state. Then, if the release switch S2 is off, then it is judged at step #205 whether the input port P10 of the microcomputer μC is at a "High" level or a "Low" level. If the input port P10 is at a "High" level, then, this means that all of the photographing preparing switch S1, AE locking switch $S_{AEL}$ and learning mode switch $S_Q$ remain in an off state, and accordingly, the control sequence advances to step #200 at which the display is erased, whereafter the microcomputer μC and hence the camera enter a rest state. On the contrary if the input port P10 is at a "Low" level at step #205, this means that any one of the photographing preparing switch S1. AE locking switch $S_{AEL}$ and learning mode switch $S_Q$ is in an on state, and accordingly, the control sequence returns to step #10 of the flow chart shown in FIG. 4.

On the other hand, in case the release switch S2 is on at step #175, exposure control is executed at step #180 in accordance with the shutter speed TV and aperture value AV calculated at step #165 described hereinabove. After then, it is judged at step #185 from the flag LMF whether or not a learning mode is set. If the flag LMF is not set, then it is determined that a learning mode is not set, and accordingly, the control sequence advances directly to step #200. On the contrary if the flag LMF is set, then a learning mode is set, and accordingly, the flag LMF is reset to cancel the learning mode at step #190. Then, it is judged at step #191 whether the spot light measuring switch $S_{SP}$ is in an on state or off state. If the switch $S_{SP}$ is off, then it is considered that the camera is not in a spot light measuring mode, and the control sequence advances to step #195 at which learning is executed, whereafter the control sequence advances to step #200. On the contrary if the switch $S_{SP}$ is on at step #191, then it is considered that the camera is in a spot light measuring mode, and accordingly, the control sequence advances to step #192 at which it is judged whether the AE locking switch $S_{AEL}$ is in an on state or off state. If the switch $S_{AEL}$ is off, then the control sequence advances directly to step #200, but on the contrary if the switch $S_{AEL}$ is on, then the correction value BV5 (=BV2−BV6) described hereinabove is determined as an exposure correction value BV4 at step #193, whereafter the control sequence advances to step #195. At step #195, a scene of the object for photographing is discriminated from the reference measurement light value BVrf, photographing magnification β and brightness difference ΔBV, and N correction values ΔBVci stored for such scene in the E²PROM are recalled and contents thereof are updated by one. In particular, for each of i=2, ..., N, ΔBVci is substituted into ΔBVc(i−1) so that the most precedently inputted or oldest connection value ΔBVc1 may be erased and the exposure connection value BV4 described above may be inputted as the latest connection value ΔBVcN. After then, the control sequence advances to step #200 at which the display is erased, whereafter the microcomputer µC enters a rest state.

Figure 7A:
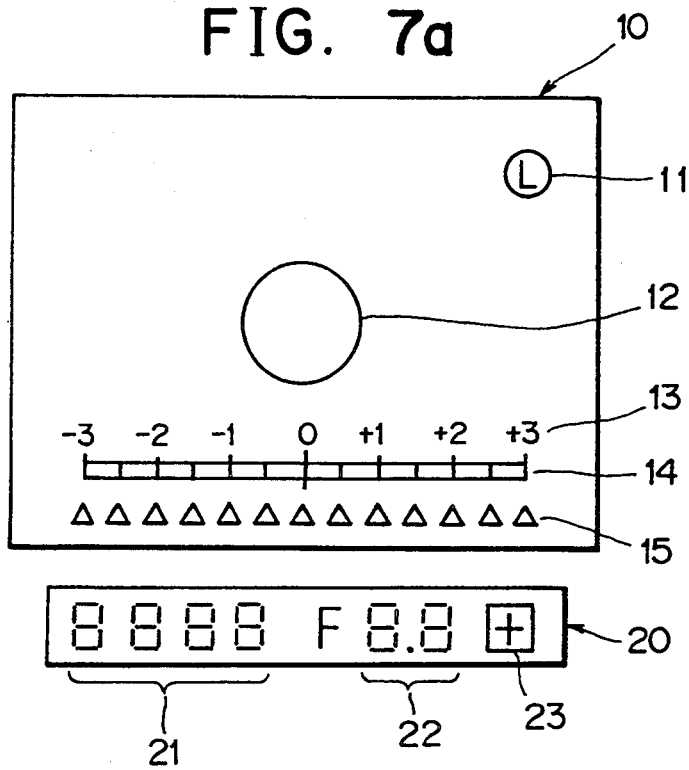
FIG. 7a to 7f are diagrammatic representations showing in-finder displays of the camera of FIG. 1.

Subsequently, contents of display by the display circuit DSP will be described with reference to FIGS. 7a to 7f. FIG. 7a shows a display when display segments which can display in a field of view of the viewfinder of the camera are all placed in an operative or displaying condition by the display circuit DSP. In FIG. 7a, reference numeral 10 denotes a photographing screen which can be seen when a photographer looks into the viewfinder of a single-lens reflect camera. In order to provide a display in the photographing screen, a transmission type LCD (liquid crystal display panel) of the guest-host type is disposed on a focus screen of a viewfinder optical system. Contents in such photographing screen will be described. Reference numeral 11 denotes a mark which is displayed when a learning mode is set. Reference numeral 12 denotes a spot light measuring area which is equivalent to the central area SP of the photographing screen shown in FIG. 2. Reference numeral 13 denotes a numeral representative of a deviation from a reference value indicated at 0 in EV value. If the sign of a numeral is positive, then this means that the exposure is over, but on the contrary if the sign is negative, then the exposure is under. Reference numeral 14 denotes a graduation bar provided for (⅓) EV. Reference numeral 15 denotes an index for display of a deviation, and up to 13 such indices are disposed at a (⅓) EV distance along the graduation bars. The indices can be individually controlled such that, as seen in FIGS. 7b to 7f, each of them provides a display of a blank triangle "Δ" or a dark smeared out triangle " " or no display. Reference numeral 20 denotes an in-finder display section displayed below the photographing screen 10. The in-finder display section 20 includes a control shutter speed display portion 21, a control aperture value display portion 22 and an override display portion 23. At the override display portion 23, the sign of "+" or "−" surrounded by a square is displayed when exposure correction is performed, but when no exposure correction is performed, no display is provided at the override display portion 23.

Figure 7B:
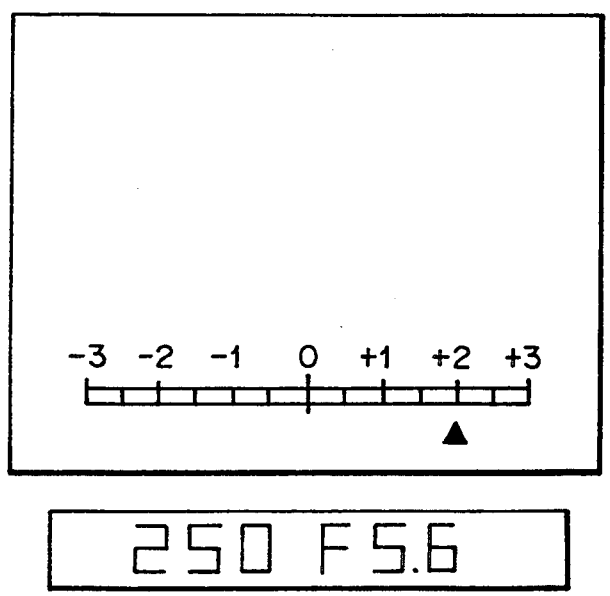

Subsequently, various examples of display will be described. FIG. 7b shows an example of display in a normal light measuring condition (only the photographing preparing switch S1 is on). In this instance, since the camera is in an automatic light measuring mode, the spot light measuring area is not displayed. Where a reference measurement light value BVrf (a spot measurement light value $BV_{SP}$ or an average measurement light value $(BV_{SP}+8\ BV_{AM})/9$) is taken as the origin of the graduation bars (point at which the numeral is 0), a measurement light value in an automatic light measuring mode is indicated as a deviation from the origin by an Index of a dark smeared out triangle " ". Meanwhile, externally below the photographing screen, a control shutter speed and a control aperture value based on the measurement light value in an automatic light measuring mode are displayed.

Figure 7C:
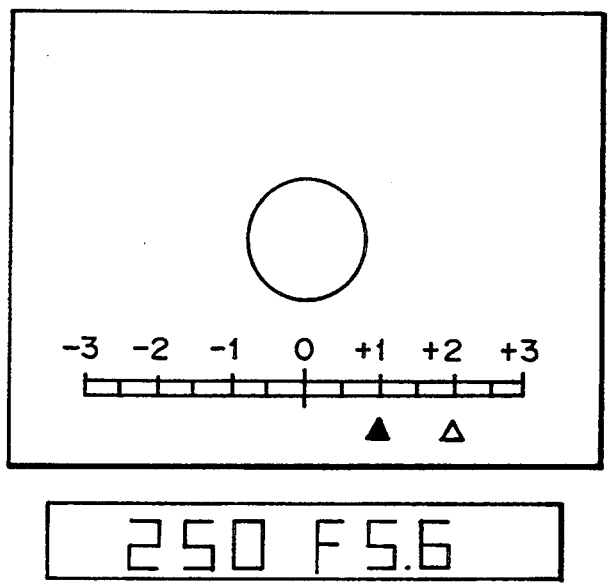

FIG. 7c shows an example of display when the spot light measuring switch $S_{SP}$ is turned on to select a spot light measuring mode. In this instance, the spot light measuring area is displayed at the center of the photographing screen. Further, where a reference measurement light value BVrf is taken as the origin of the graduation bars, a spot measurement light value is indicated as a deviation from the origin by an index of a dark smeared out triangle " " while a measurement light value obtained in an automatic light measuring mode is indicated by an index of a blank triangle "Δ". Here, an average measurement light value is selected as a reference measurement light value BVrf, and if it is assumed that otherwise a spot measurement light value is selected, then an index of a dark smeared out triangle " " will be displayed on the origin of the graduation bars. It is to be noted that, externally below the photographing screen, a control shutter speed and a control aperture value based on the spot measurement light value.

Figure 7D:
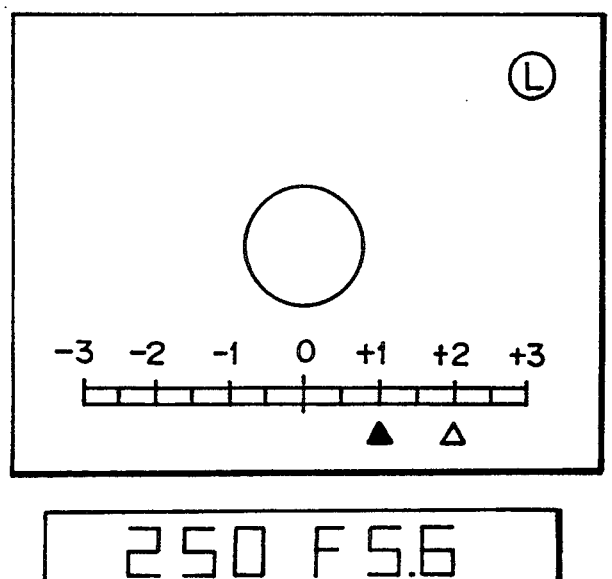

FIG. 7d shows an example of display when the AE locking switch $S_{AEL}$ is turned on while a learning mode is set in a spot light measuring condition. In this instance, the mark indicating a learning mode is displayed at the right upper corner of the photographing screen. If exposure control is executed in this condition, then a difference between a measurement light value in an automatic light measuring mode and a spot measurement light value is learned so that it is fed back to a measurement light value in an automatic light measuring mode in a next photographing operation.

Figure 7E:
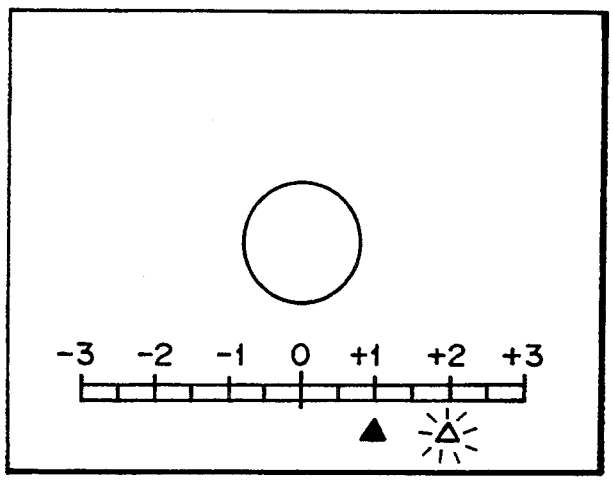

FIG. 7e shows an example of display when an override (exposure correction) is applied in a spot light measuring condition. In this instance, where a reference measurement light value BVrf (average measurement light value here) is taken as the origin of the graduation bars, a control value (exposure value which is used in control) to which an override is applied is indicated as a deviation from the origin by an index of a dark smeared out triangle " " while a spot measurement light value before an override is applied is indicated by an index of a blinking blank triangle "Δ". Here, the reason why the blank triangle "Δ" is being blinked is that the index indicates not a measurement light value in an automatic light measuring mode but a spot measurement light value. It is to be noted that, externally below the right lower corner of the photographing screen, the mark "—" is displayed in order to indicate that the measurement light value displayed is a value to which an override is applied.

Figure 7F:
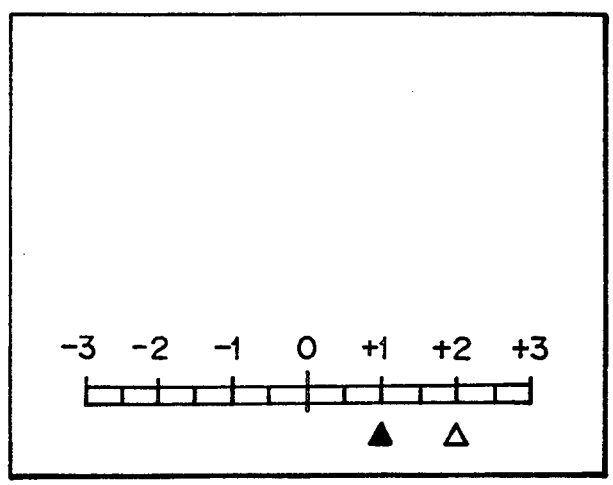

FIG. 7f shows an example of display when an override is applied in an automatic light measuring mode. In this instance, where a reference measurement light value BVrf (spot measurement light value or average measurement light value) is taken as the origin of the graduation bars, a control value to which an override is applied is indicated as a deviation from the origin by an index of a dark smeared out triangle " " while a measurement light value in an automatic light measuring mode before an override is applied is indicated by an index of a blank triangle "Δ". It is to be noted that, in an automatic light measuring mode, if a learning mode is set, then the mark indicating a learning mode is displayed irrespective of an on or off state of the AE locking switch $S_{AEL}$.

It is to be noted that, while the displays of the shutter speed and the aperture value for exposure control are shown in FIGS. 7b to 7f that they all have individually equal values, naturally they are varied by correction of an exposure value or a variation of a brightness of a field to be photographed.

Figure 6:
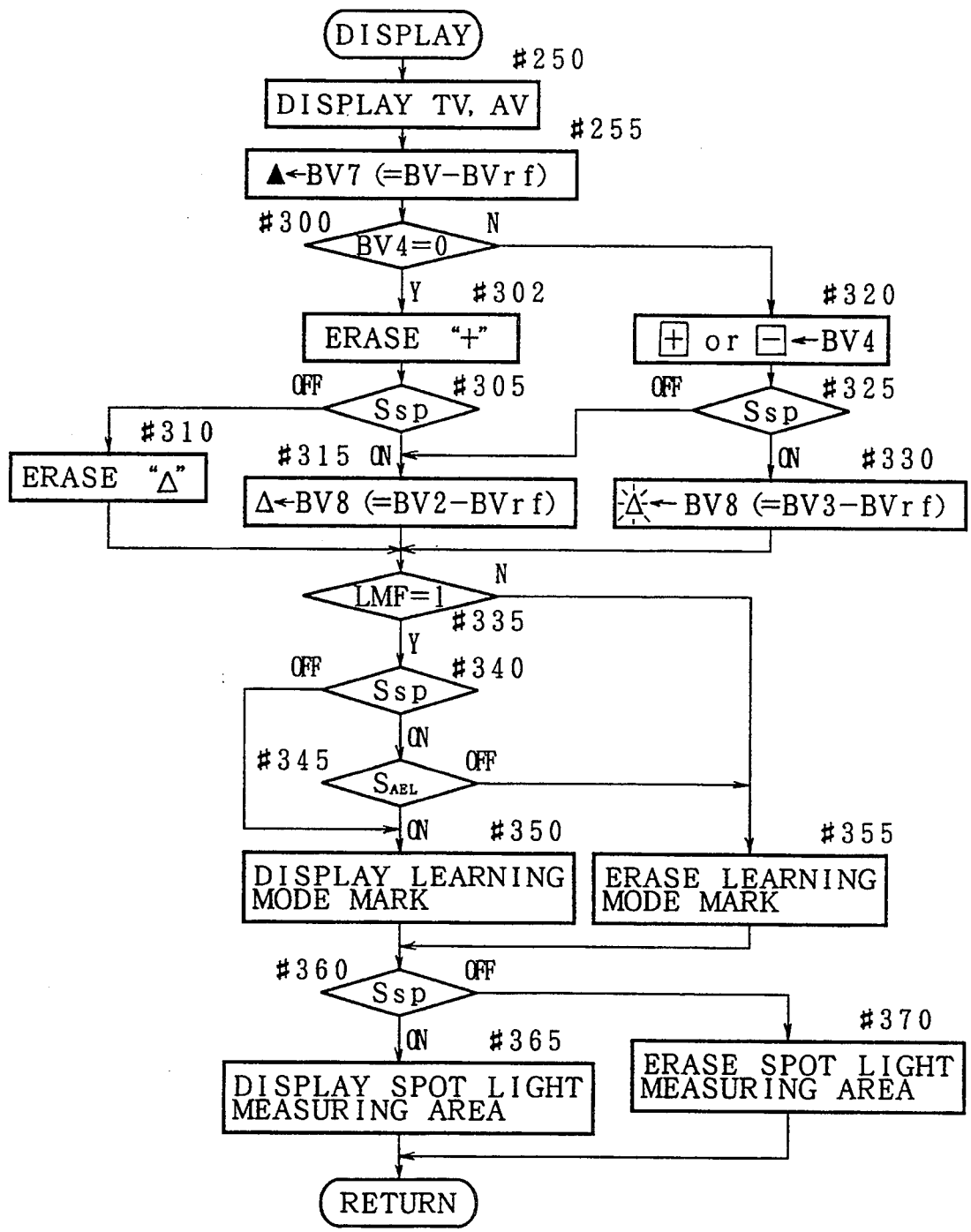

Referring now to FIG. 6, there are shown details of the display subroutine at step #170 of FIG. 5 mentioned hereinabove. After the subroutine is called, a shutter speed TV and an aperture value AV are displayed first at step #250, and then an index of " " is displayed at the location corresponding to a value BV7 (=BV−BVrf) at step #255, whereafter it is judged at step #300 whether or not the exposure correction value BV4 is equal to 0. If the exposure correction value BV4 is equal to 0, then the override display of "⇌" or "−" is erased at step #302, and then it is judged at step #305 whether the spot light measuring switch $S_{SP}$ is on. If the spot light measuring switch $S_{SP}$ is off, then this means that the index of " " described above represents a deviation of aim automatic measurement light value from a reference measurement light value, and the index of "Δ" is erased at step #310, whereafter the control sequence advances to step #335. On the other hand, in case the spot light measuring switch $S_{SP}$ is on at step #305, this means that the index of " " represents a deviation of a spot measurement light value from a reference measurement light value. And an index of "Δ" is displayed at a location corresponding to a value BV8 (=BV2−BVrf) at step #315 so that a deviation of an automatic measurement light value from the reference measurement light value may be displayed additionally, whereafter the control sequence advances to step #335. Meanwhile, if the exposure correction value BV4 is not equal to 0 at step #300, then the override display of "+" (over) or "−" (under) is executed at step #320 in accordance with a value of the exposure correction value BV4. Then at step #325, it is judged whether or not the spot light measuring switch $S_{SP}$ is on or off. If the spot light measuring switch $S_{SP}$ is off at step #325, then this means that the index of " " described above represents a deviation of an exposure corrected automatic measurement light value from a reference measurement light value. And the control sequence advances to step #315 described above in order to display a deviation of the automatic measurement light value before exposure correction from the reference measurement light value. On the contrary, if the spot light measuring switch $S_{SP}$ is on at step #325, then this means that the index of " " described above represents a deviation of an exposure corrected spot measurement light value from the reference measurement light value. And in order to additionally display a deviation of a spot measurement light value before exposure correction from the reference measurement light value, the control sequence advances to step #330 at which an index of "Δ" is displayed blinking at a location corresponding to a value BV8 (=BV3−BVrf), whereafter the control sequence advances to step #335. As apparent from the description so far, an index of " " represents a deviation from a reference measurement light value of a measurement light value which is used for control, an index of "Δ" represents a deviation of an automatic measurement light value from a reference measurement light value, and blinking display of such index of "Δ" represents a deviation of a spot measurement light value before exposure correction from a reference measurement light value.

At step #335, it is judged from the flag LMF whether or not a learning mode is set. If the flag LMF is equal to 1. then this means that a learning mode is set, and accordingly, it is judged subsequently at step #340 whether the spot light measuring switch $S_{SP}$ is on or off. If the spot light measuring switch $S_{SP}$ is on, then it is judged at step #345 whether the AE locking switch $S_{AEL}$ is on or off. If the AE locking switch $S_{AEL}$ is on, then the mark indicative of a learning mode is displayed at step #350, but on the contrary if the AE locking switch $S_{AEL}$ is off, then the display of the mark indicative of a learning mode is erased at step #355, whereafter the control sequence advances to step #380 in either case. On the other hand, in case the spot light measuring switch $S_{SP}$ is off at step #340, the control sequence advances, irrespective of a state of the AE locking switch $S_{AEL}$, to step #350 at which the mark indicative of a learning mode is displayed. Meanwhile, In case the flag LMF is not equal to 1 at step #335, the control sequence advances to step #355 at which the display of the mark indicative of a learning mode is erased. At step #380, it is judged whether or not the spot light measuring switch $S_{SP}$ is on or off, and if the spot light measuring switch $S_{SP}$ is on, then the spot light measuring area is displayed at step #365, but on the contrary if the spot light measuring switch $S_{SP}$ is off, then the display of the spot light measuring area is erased at step #370, whereafter the control sequence returns to the main routine of FIG. 5 in either case.

Figure 8:
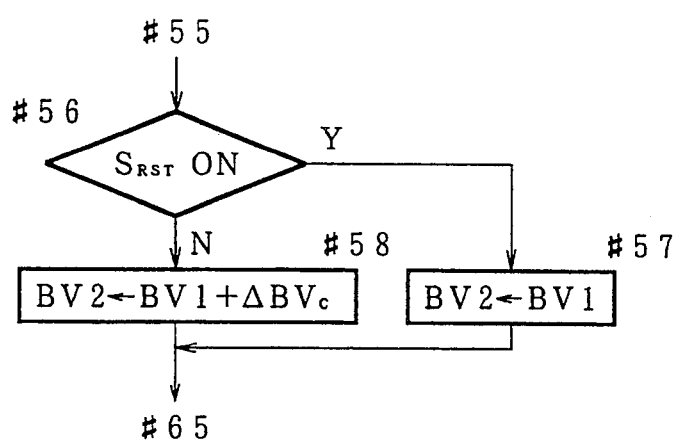
FIGS. 8 and 9 are flow charts showing modifications to part of the flow chart of FIG. 4.

Referring now to FIG. 8, there is shown part of a flow chart which is a modification to the flow chart shown in FIG. 4. Where such modified flow chart is employed, an additional switch $S_{RST}$ is connected to an additional input port (not shown) of the microcomputer μC shown in FIG. 1. In the modified flow chart shown in FIG. 8, the step #60 in the flow chart of FIG. 4 is replaced by three steps #56, #57 and #58. In particular, at step #56 after step #55, it is judged whether or not the switch $S_{RST}$ is on. Then, if the switch $S_{RST}$ is on, the measurement light value $BV_1$ is substituted into the automatic measurement light value BV2 at step #57, but on the contrary if the switch $S_{RST}$ is off, then the correction value ΔBVc is added at step #58 to the measurement light value BV1 to obtain an automatic measurement light value BV2 similarly as at step #60, whereafter the control sequence advances to step #65 in either case. It is to be noted that the switch $S_{RST}$ may be a normally open switch which returns to its normal open position when it is released from its operated condition or may be a change-over switch which maintains a position once it is changed to the position.

Figure 9:
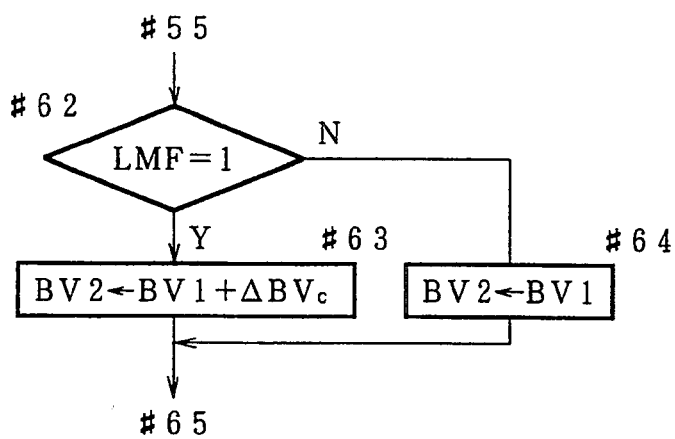

FIG. 9 shows another modification to the flow chart shown in FIG. 4. Where the present modified flow chart is employed, no such switch $S_{RST}$ is employed, but the control flag LMF is used. Then, the step #60 in the flow chart of FIG. 4 is replaced here by different three steps #62, #63 and #64. In particular, at step #62 after step #55, it is judged whether or not the control flag LMF is in a set state, and if the control flag LMF is in a set state, then the correction value ΔBVc is added at step #63 to the measurement light value BV1 to obtain an automatic measurement light value BV2 similarly as at step #60, but on the contrary if the control flag LMF is not in a set state, then the measurement light value BV1 is substituted into the automatic measurement light value BV2 at step whereafter the control sequence advances to step #65 in either case.

Finally, those of the variables used in the embodiment described above which relate to a light measurement value are listed below;

BV . . . measurement light value for control
$BV_{SP}$ . . . spot measurement light value
$BV_{AM}$ . . . peripheral area measurement light value
$BV_{AU}$ . . . average measurement light value=$(BV_{SP}+8\ BV_{AM})/9$
ΔBVci . . . N exposure correction values learned for a particular scene
ΔBVc . . . average value of N exposure correction values
BV1 . . . multi-division measurement light value=k $BV_{SP}+(1-k)\ BV_{AM}$
BV2 . . . automatic measurement light value=BV1+ΔBVc
BV3 . . . final measurement light value (BV2 or $BV_{SP}$)
BV4 . . . correction value relying upon personality of photographer
BV5 . . . correction value relying upon reflectance of object for photographing
BV6 . . . measurement light value before manual exposure correction
BV7 . . . deviation for display of black index " "
BV8 . . . deviation for display of white index "Δ"
BVrf . . . reference measurement light value for display of deviation ($BV_{SP}$ or $BV_{AU}$)
BVk . . . minimum unit for setting of override amount (⅛ EV)

Having now fully described the invention, it will be apparent to one of ordinary skill in the art that many changes and modifications can be made thereto without departing from the spirit and scope of the invention as set forth herein.

What is claimed is:

1. A camera, comprising:
   first setting means for manually setting first data for photographing;
   first controlling means for controlling operation of said camera in accordance with the first data;
   storage means having storage sections corresponding to possible conditions of an object to be photographed, each of said storage sections storing data for automatic control of the camera;
   condition detecting means for detecting a condition of an object to be photographed;
   second setting means for setting second data in accordance with the data stored in the storage section corresponding to the condition detected by said condition detecting means;
   second controlling means for controlling operation of said camera in accordance with the second data;
   selecting means for selecting one of said first controlling means and said second controlling means; and
   storage controlling means for updating data of one of said storage sections which corresponds to the condition detected by said condition detecting means in accordance with the first data.

2. A camera as claimed in claim 1, further comprising light measuring means for measuring a brightness of an object to be photographed, and calculating means for calculating an exposure control value in accordance with the brightness of the object, said first controlling means including first correcting means for correcting the exposure control value in accordance with the first data, said first controlling means executing exposure control in accordance with the exposure control value corrected by said first correcting means, said second controlling means including second correcting means for correcting the exposure control value in accordance with the second data, said second controlling means executing exposure control in accordance with the exposure control value corrected by said second correcting means.

3. A camera as claimed in claim 1, wherein the condition of the object to be photographed is a photographing magnification of the object.

4. A camera as claimed in claim 1, wherein the condition of the object to be photographed is a difference between a brightness of a main object to be photographed and a brightness of background.

5. A camera as claimed in claim 1, wherein the condition of the object to be photographed is an average brightness measured by said light measuring means.

6. A camera, comprising:
   light measuring means for measuring a brightness of an object to be photographed;
   first calculating means for calculating an exposure control value in accordance with the brightness of the object for the photographing detected by said light measuring means;
   storage means for storing therein information regarding a plurality of previous exposure controls;
   second calculating means for calculating an exposure control value in accordance with the brightness of the object for the photographing detected by said light measuring means and the information stored in said storage means; and
   selecting means for selecting one of the exposure control values calculated by said first calculating means and said second calculating means,
   said light measuring means including first light measuring means for measuring light of a comparatively large area of a screen, second light measuring means for measuring light of a comparatively small area of the screen, and means for manually selecting one of the light values measured by said first light measuring means and said second light measuring means, and
   said selecting means selecting the exposure control value calculated by said first calculating means when the light value measured by said second light measuring means is selected by said light measuring means.

7. A camera, comprising:

light measuring means including first light measuring means for measuring light of a comparatively large area of a screen, second light measuring means for measuring light of a comparatively small area of the screen, and selecting means for manually selecting one of the light values measured by said first light measuring means and said second light measuring means;

storage means for storing therein information regarding a plurality of previous exposure controls;

calculating means for calculating an exposure control value in accordance with a measurement light output of said light measuring means and the information stored in said storage means;

exposure controlling means for executing exposure control in accordance with the exposure control value calculated by said calculating means;

learning data calculating means for calculating a difference between the measurement light value detected by said first light measuring means and the measurement light value detected by said second light measuring means; and storage controlling means for updating contents of the information stored in said storage means in accordance with the difference when the measurement light value by said second light measuring means is manually selected by said selecting means.

8. A camera as claimed in claim 7 further comprising automatic exposure locking means for maintaining a mesurement light output at a point of time when it is manually operated, said storage controlling means executing its updating operation when automatic exposure of said camera is locked.

9. A camera comprising:
manual setting means for manually setting first data for the photographing;
manual controlling means for controlling operation of said camera in response to the first data;
storage means for storing therein a plurality of manually set values obtained at a plurality of previous photographing operations;
calculating means for calculating second data for a current photographing operation in accordance with the stored data of said storage means; and
automatic controlling means for controllng operation of said camera in accordance with the second data calculated by said calculating means.

10. A camera as claimed in claim 9, wherein said storage means has a number of storage sections equal to the predetermined number of manual operations of said manual setting means and operates such that, when latest data are stored into said storage means, oldest data are erased from said storage means.

11. A camera, comprising:
light measuring means for measuring a brightness of an object to be photographed;
calculating means for calculating an exposure control value in accordance with the brightness of the object to be photographed;
manual setting means for manually setting first data with which the exposure control value is to be corrected;
manual correcting means for correcting the exposure control value in accordance with the first data;
storage means for storing therein a plurality of first data obtained at a plurality of previous photographing operations;
automatic setting means for calculating second data from the first data stored in said storage means;
automatic correcting means for correcting the exposure control value in accordance with the second data;
selecting means for selecting one of said manual correcting means and said automatic correcting means; and
exposure controlling means for executing exposure control in accordance with the exposure control value corrected by a selected one of said manual and automatic correcting means.

12. A camera as claimed in claim 11, wherein sid first data are stored into said storage means in response to operation of said exposure controlling means.

13. A camera, comprising:
light measuring means for measuring a brightness of an object to be photographed;
calculating means for calculating an exposure control value in accordance with the brightness of the object to be photographed;
manual setting means for manually setting first data with which the exposure control value is to be corrected;
correcting means for correcting the exposure control value in accordance with the first data;
data outputting means for outputting data for automatic correction of the exposure control;
automatic correcting means for correcting the exposure control value in accordance with the data from said data outputting means;
selecting means for selecting one of said manual correcting means and said automatic correcting means;
changing means for changing the data to be received by said automatic correcting means to second data calculated from data being currently outputted from said data outputting means and the first data set by said manual setting means; and
exposure controlling means for executing exposure control in accordance with the exposure control value corrected by a selected one of said manual and automatic correcting means, wherein said changing means operates in response to operation of said exposure controlling means.

14. A camera, comprising:
a manual operation member;
means, in response to the manual operation member, for setting first data utilized for controlling an operation of the camera;
means for outputting second data which is stored in the camera and is utilized for controlling the operation of the camera in accordance with a tendency of data set in preceding camera operations, wherein an operator can select whether to use the second data;
means for correcting the second data in accordance with the first data;
means for selecting one of a first mode in which said correcting means operates and a second mode in which said correcting means does not operate; and
means for displaying that said second data is to be corrected in accordance with the first data when the first mode is selected by the selecting means.

15. A camera as claimed in claim 14, wherein said display means is a display element in a viewfinder of said camera.

16. A camera as claimed in claim 14, wherein said correcting means operates at a predetermined timing.

17. A camera as claimed in claim 16, wherein the predetermined timing is a timing at which exposure control is executed.

18. A camera as claimed in claim 14 wherein the correcting means corrects the second data in accordance with the plurality of first data set in response to preceding operations of the manual operation member.

19. A camera, comprising:
a manual operation member;
means, in response to an operation of the manual operation member, for setting first data utilized for controlling an operation of the camera;
means for outputting second data which is stored in the camera and is utilized for controlling the operation of the camera in accordance with a tendency of data set in preceding camea operations, wherein an operator can select whether to use the second data;
correcting the second data in accordance with the first data; and
means for selecting one of a first mode in which said correcting means operates and a second mode in which said correcting means does not operate, said mode selecting means operating automatically in response to a predetermined condition.

20. A camera as claimed in claim 19, wherein said selecting means automaticlaly selectes the second mode in response to an exposure controlling operation of said camera.

21. A camera as claimed in claim 19, wherein the correcting means corrects the second data in accordance with the plurality of first data set in response to preceding operations of the manual operation member.

22. A camera, comprising:
a first manual operation member;
means, in response to an operation of the first manual operation member, for setting first data utilized for controlling an operation of the camera;
means for outputting second data which is stored in the camera and is utilized for controlling the operation of the camera in accordance with a tendency of data set in preceding camera operations, wherein an operator can select whether to use the second data;
means for correcting the second data in accordance with the first data;
a second manual operation member;
means, in response to an operation of the second manual operation member, for setting a first mode in which the correcting means operates;
a third manual operation member; and
means, in response to an operation of the third manual operation member when said first mode is set, for setting a second mode in which the correcting means does not operate.

23. A camera as claimed in claim 22, wherein the third manual operation member is a release operation member for the starting of exposure control.

24. A camera as claimed in claim 22, wherein the correcting means corrects the second data in accordance with the plurality of first data set in response to preceding operations of the first manual operation member.

25. A camera, comprising:
a manual operation member;
means, in response to an operation of the manual operation member, for setting first data utilized for controlling an operation of the camera;
means for outputting second data which is stored in the camera and is utilized for controlling the operation of the camera in accordance with a tendency of data set in preceding camera operations, wherein an operator can select whether to use the second data;
means for correcting the second data in accordance with the first data;
selecting means for selecting one of a first mode in which said correcting means operates and a second mode in which said correcting means does not operate; and
means for causing, in the first mode, said correcting means to operate in response to a predetermined operation of said camera.

26. A camera as claimed in claim 25, wherein the predetermined operation of said camera is an exposure controlling operation.

27. A camera as claimed in claim 25, wherein the correcting means corrects the second data in accordance with the plurality of first data set in response to preceding operations of the manual operation member.

28. A camera, comprising:
detecting means for detecting information of an object to be photographed;
calculating means for calculating first control data in accordance with the detected information;
storage means having data for the automatic correction of camera operation stored therein;
automatic correcting means for correcting the first control data in accordance with the data stored in said storage means to produce second control data;
manually setting means for producing third control data in response to a manual operation thereof;
selecting means for selecting the second control data when the third control data are not outputted from said manual setting means but selecting the third control data when the third control data are outputted from said manually setting means;
controlling means for controlling operation of said camera in response to control data selected by said selecting means;
updating means for updating, when said controlling means operates in response to the third control data, the data for the automatic correction stored in said storage means in accordance with the third control data; and
display means for displaying, when the third control data are outputted from said manually setting means, both of the second control data and the third control data.

29. A camera comprising:
manual setting means for manually setting control data;
judging means for judging a tendency of manual setting operations in accordance with information regarding manual setting operations at a plurality of previous photographing operations;
automatic setting means for automatically setting control data in accordance with the tendency judged by said judging means;
controlling means for controlling an operation of said camera in accordance with said set control data from either one of the manual setting means and the automatic setting means;

selecting means for selecting one of a first mode in which said automatic setting means operates and a second mode in which said automatic setting means will not operate; and storing means for storing control data set by the automatic setting means irrespective of selecting the first or second mode.

30. A camera as claimed in claim 29, wherein said judging means has storage means for storing information regarding manual setting data at a plurality of previous photographing operation.

31. A camera as claimed in claim 29, wherein said manual set control data is automatically stored in response to a photographing operation.

32. A camera as claimed in claim 29, wherein said judging means judges a tendency of manual setting operations by averaging manual set control data at a plurality of previous photographing operations stored in said storage means.

33. A camera as claimed in claim 29, wherein said judging means has storage means for storing information regarding manual setting operation every photographing operation.

34. A camera as claimed in claim 33, further including storage prohibiting means for prohibiting operation of said storage means under a predetermined condition.

35. A camera as claimed in claim 29, further including display means for displaying selection of said first mode.

36. A camera, comprising:

manual setting means for manually setting control data;

judging means for judging a tendency of manual setting operations in accordance with information regarding manual setting operations at a plurality of previous manual setting operations;

automatic setting means for automatically setting control data in accordance with the tendency judged by said judging means;

controlling means for controlling operation of said camera in accordance with said control data from either one of said manual setting means for manually setting control data and said automatic setting means for automatically setting control data; and display means for displaying both said control data set by said manual setting means and said control data set by said automatic setting means.

37. A camera as claimed in claim 36, wherein the display means displays the control data on a bar graph.

* * * * *

UNITED STATES PATENT AND TRADEMARK OFFICE
CERTIFICATE OF CORRECTION

PATENT NO. : 5,359,385
DATED : October 25, 1994
INVENTOR(S) : Tatsuya ISHIDA et al It is certified that error appears in the above-indentified patent and that said Letters Patent is hereby corrected as shown below:

Title Page:
In Section [75], delete "Akuhiko" and insert -- Akihiko --.

Signed and Sealed this

Thirteenth Day of December, 1994

Attest:

BRUCE LEHMAN

Attesting Officer     Commissioner of Patents and Trademarks